US012170997B2

United States Patent
Xu et al.

(10) Patent No.: US 12,170,997 B2
(45) Date of Patent: Dec. 17, 2024

(54) FEEDBACK METHOD FOR SEMI-STATIC TRANSMISSION, NETWORK DEVICE AND TERMINAL DEVICE

(71) Applicant: GUANGDONG OPPO MOBILE TELECOMMUNICATIONS CORP., LTD., Guangdong (CN)

(72) Inventors: Jing Xu, Dongguan (CN); Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 433 days.

(21) Appl. No.: 17/515,221

(22) Filed: Oct. 29, 2021

(65) Prior Publication Data
US 2022/0053535 A1 Feb. 17, 2022

Related U.S. Application Data

(63) Continuation of application No. PCT/CN2019/085387, filed on Apr. 30, 2019.

(51) Int. Cl.
*H04W 72/12* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01); *H04W 72/0446* (2013.01); *H04W 72/23* (2023.01)

(58) Field of Classification Search
CPC .......... H04W 72/1273; H04W 72/0446; H04L 1/1812; H04L 5/0053; H04L 5/0055; H04L 1/1854; H04L 1/1896; H04L 1/1861
See application file for complete search history.

(56) References Cited

U.S. PATENT DOCUMENTS 10,848,291 B2 * 11/2020 Yang .................... H04W 72/21
11,108,504 B2 * 8/2021 Takeda .................. H04L 1/1864
(Continued)

FOREIGN PATENT DOCUMENTS

CN 101807981 A 8/2010
CN 109155714 A 1/2019
(Continued)

OTHER PUBLICATIONS

Huawei, HiSilicon, "Discussion on SPS HARQ-ACK bit handling in case of dynamic codebook configuration for eCA", R1-162105, 3GPP TSG RAN WG1 Meeting #84bis, Busan, Korea, Apr. 11-15, 2016, all pages.

(Continued)

Primary Examiner — Jay P Patel
(74) Attorney, Agent, or Firm — Ladas & Parry, LLP

(57) ABSTRACT

The present disclosure discloses a feedback method for semi-static transmission, a terminal device, a network device, a chip, a computer-readable storage medium, a computer program product and a computer program. The method includes: determining a first HARQ-ACK codebook, where the first HARQ-ACK codebook includes a second HARQ-ACK codebook and/or a third HARQ-ACK codebook that are combined, and a downlink transmission occasion window corresponding to the second HARQ-ACK codebook is independent from a downlink transmission occasion window corresponding to the third HARQ-ACK codebook; and sending the first HARQ-ACK codebook.

16 Claims, 8 Drawing Sheets

(51) Int. Cl.
  *H04L 5/00* (2006.01)
  *H04W 72/0446* (2023.01)
  *H04W 72/1273* (2023.01)
  *H04W 72/23* (2023.01)

(56) References Cited

U.S. PATENT DOCUMENTS

| | | | |
|---|---|---|---|
| 11,245,496 B2* | 2/2022 | Peng | H04W 72/23 |
| 11,368,260 B2* | 6/2022 | Medies | H04L 5/0092 |
| 11,848,782 B2* | 12/2023 | Lin | H04W 72/20 |
| 2019/0103943 A1* | 4/2019 | Wang | H04L 1/1854 |
| 2019/0342041 A1* | 11/2019 | Medles | H04L 5/0092 |
| 2020/0205141 A1* | 6/2020 | Khoshnevisan | H04L 5/0044 |
| 2020/0213044 A1* | 7/2020 | Peng | H04L 1/1864 |
| 2020/0267597 A1* | 8/2020 | Huang | H04W 76/14 |
| 2020/0295882 A1* | 9/2020 | Wang | H04L 1/1854 |
| 2021/0050948 A1* | 2/2021 | Gao | H04W 72/23 |
| 2021/0050961 A1* | 2/2021 | Chen Larsson | H04L 1/1861 |
| 2021/0067273 A1* | 3/2021 | Lin | H04L 1/1812 |
| 2021/0153204 A1* | 5/2021 | Takeda | H04W 72/23 |
| 2021/0194637 A1* | 6/2021 | Lin | H04L 1/1812 |
| 2021/0234643 A1* | 7/2021 | Wang | H04L 1/1887 |
| 2022/0109527 A1* | 4/2022 | Hwang | H04W 72/23 |
| 2022/0159692 A1* | 5/2022 | Lee | H04L 5/0053 |
| 2022/0166541 A1* | 5/2022 | Takeda | H04L 1/1864 |
| 2022/0174693 A1* | 6/2022 | Takeda | H04W 72/20 |

FOREIGN PATENT DOCUMENTS

| | | | | |
|---|---|---|---|---|
| CN | 109639398 A | | 4/2019 | |
| CN | 110138531 A | * | 8/2019 | ........... H04L 5/0055 |
| CN | 110351022 A | * | 10/2019 | |
| CN | 110943805 B | * | 6/2021 | ............... H04L 1/08 |
| EP | 3429109 B1 | * | 12/2020 | ............... H04L 1/16 |
| EP | 3657721 B1 | * | 9/2021 | ........... H04B 7/0456 |
| EP | 3952509 A4 | * | 10/2022 | ........... H04L 1/1812 |
| EP | 3900242 B1 | * | 12/2023 | ........... H04B 7/0456 |
| WO | 2018204491 A1 | | 11/2018 | |
| WO | 2019028875 A1 | | 2/2019 | |
| WO | WO-2019153964 A1 | * | 8/2019 | ........... H04L 1/1607 |
| WO | WO-2019157950 A1 | * | 8/2019 | ........... H04L 1/1607 |
| WO | WO-2019218869 A1 | * | 11/2019 | ........... H04L 1/1812 |
| WO | WO-2020194459 A1 | * | 10/2020 | |
| WO | WO-2020194514 A1 | * | 10/2020 | ........... H04L 1/1812 |
| WO | 2020220360 A1 | | 11/2020 | |

OTHER PUBLICATIONS

Office Action from the corresponding European patent application No. 19927287.3, dated Jun. 30, 2023.

International Search Report (ISR) dated Jan. 19, 2020 for Application No. PCT/CN2019/085387.

Written Opinion dated Jan. 19, 2020 for Application No. PCT/CN2019/085387.

The EESR of corresponding European application No. 19927287.3, dated Mar. 29, 2022.

ZTE:"UL control enhancements for NR URLLC", 3GPP Draft; R1-1904144, 3rd Generation Partnership Project (3GPP), Mobile Competence Centre; 650, Route Des Lucioles; F-06921 Sophia-Antipolis Cedex; France, vol. RAN WG1, No. Xi' an, China; Apr. 8, 2019-Apr. 12, 2019, Apr. 3, 2019(Apr. 3, 2019), XP051707144, entire document.

* cited by examiner

FEEDBACK METHOD FOR SEMI-STATIC TRANSMISSION, NETWORK DEVICE AND TERMINAL DEVICE

CROSS-REFERENCE TO RELATED APPLICATIONS

This application is a continuation of International Application No. PCT/CN2019/085387, filed on Apr. 30, 2019, the disclosure of which is hereby incorporated by reference in its entirety.

TECHNICAL FIELD

The present disclosure relates to the field of information processing technology and, in particular to a feedback method for semi-static transmission, a network device, a terminal device, a chip, a computer-readable storage medium, a computer program product and a computer program.

BACKGROUND

In a communication system, there are two types of data transmission modes including: dynamic transmission and semi-persistent scheduling (SPS). In NR Rel 16, considering that an SPS period is shortened, the shortest one may be as short as 2 symbols. If an existing mechanism is still used, that is, an SPS feedback window is the same as a dynamic feedback window, because the SPS period is shortened, the amount of feedback of the SPS may increase sharply under the same size of the dynamic feedback window, resulting in that one physical uplink control channel (PUCCH) will carry tens of bits of hybrid automatic repeat request-acknowledgement (HARQ-ACK). FIG. 1-2 shows a situation similar to FIG. 1-1, that is, the feedback window is still 8 slots (same as FIG. 1-1), but there are 7 SPS transmission occasions in each slot (the SPS period is 2 symbols, then the number of SPS transmission occasions in one slot is 14/2=7), then hybrid automatic repeat request-acknowledgement HARQ-ACK feedback of the SPS requires 7*8 bits (56 bits in total). The sharp increase in the amount of HARQ-ACK feedback will affect reliability of PUCCH transmission, and users with limited power cannot even transmit such a large amount of information.

In addition, for the NR Rel 16, a skipped SPS technology is considered to be used, that is, SPS resources are configured semi-statically. However, whether to use the resources depends on service conditions, so there will be idle SPS resources. Feeding back HARQ-ACK for the idle SPS resources will not only cause waste of PUCCH resources, but also affect reliability of effective HARQ-ACK feedback due to the excessive amount of carried information.

SUMMARY

Embodiments of the present disclosure provide a feedback method for semi-static transmission, a network device, a terminal device, a chip, a computer-readable storage medium, a computer program product and a computer program, to solve the above technical problem.

A first aspect provides a feedback method for semi-static transmission, applied to a terminal device, where the method includes:
  determining a first HARQ-ACK codebook; where the first HARQ-ACK codebook includes a second HARQ-ACK codebook and/or a third HARQ-ACK codebook that are combined; a downlink transmission occasion window corresponding to the second HARQ-ACK codebook is independent from a downlink transmission occasion window corresponding to the third HARQ-ACK codebook; and
  sending the first HARQ-ACK codebook.

A second aspect provides a feedback method for semi-static transmission, applied to a network device, where the method includes:
  receiving a first HARQ-ACK codebook sent by a terminal device; where the first HARQ-ACK codebook includes a second HARQ-ACK codebook and/or a third HARQ-ACK codebook that are combined; a downlink transmission occasion window corresponding to the second HARQ-ACK codebook is independent from a downlink transmission occasion window corresponding to the third HARQ-ACK codebook.

A third aspect provides a terminal device, including:
  a first processing unit, configured to determine a first HARQ-ACK codebook; where the first HARQ-ACK codebook includes a second HARQ-ACK codebook and/or a third HARQ-ACK codebook that are combined; a downlink transmission occasion window corresponding to the second HARQ-ACK codebook is independent from a downlink transmission occasion window corresponding to the third HARQ-ACK codebook; and
  a first communication unit, configured to send the first HARQ-ACK codebook.

A fourth method provides a network device, including:
  a second communication unit, configured to receive a first HARQ-ACK codebook sent by a terminal device; where the first HARQ-ACK codebook includes a second HARQ-ACK codebook and/or a third HARQ-ACK codebook that are combined; a downlink transmission occasion window corresponding to the second HARQ-ACK codebook is independent from a downlink transmission occasion window corresponding to the third HARQ-ACK codebook.

By adopting the above solutions, the setting of the downlink transmission occasion windows can be optimized by independently configuring the downlink transmission occasion windows corresponding to multiple combined feedback codebooks, thereby avoiding aggregated feedback of abundant resources, which causes a problem of uplink feedback resources being overloaded and affecting transmission reliability; on the other hand, invalid feedback can be avoided and transmission efficiency is improved.

BRIEF DESCRIPTION OF DRAWINGS

FIG. 1-3 is a first schematic diagram of a communication system architecture provided by an embodiment of the present disclosure;

FIG. 2 is a first schematic flowchart of a feedback method for semi-static transmission provided by an embodiment of the present disclosure;

FIG. 3 is a second schematic flowchart of a feedback method for semi-static transmission provided by an embodiment of the present disclosure;

DESCRIPTION OF EMBODIMENTS

In order to understand the features and technical content of embodiments of the present disclosure in more detail, the implementation of the embodiments of the present disclosure is described in detail below with reference to the accompanying drawings. The accompanying drawings are for purposes of reference and explanation only, and are not used to limit the embodiments of the present disclosure.

The technical solutions in the embodiments of the present disclosure will be described below in conjunction with the drawings in the embodiments of the present disclosure. Obviously, the described embodiments are a part of the embodiments of the present disclosure, but not all of the embodiments. Based on the embodiments in the present disclosure, all other embodiments obtained by those of ordinary skill in the art without creative effort shall fall within the protection scope of the present disclosure.

The technical solutions of the embodiments of the present disclosure can be applied to various communication systems, such as: a long term evolution (LTE) system, an LTE frequency division duplex (FDD) system, and an LTE time division duplex (TDD) system or a 5G system, etc.

Figure 1:
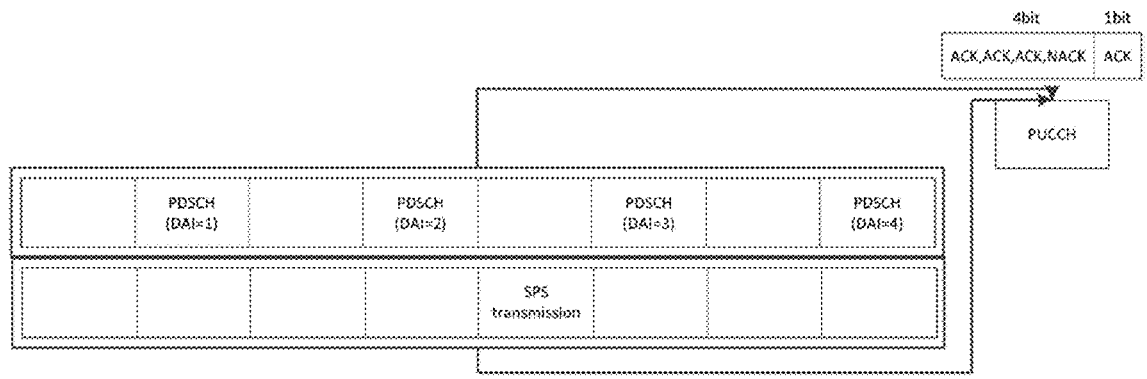
FIG. 1-1 and FIG. 1-2 are schematic diagrams of transmission and feedback.
Figures 1, 2:
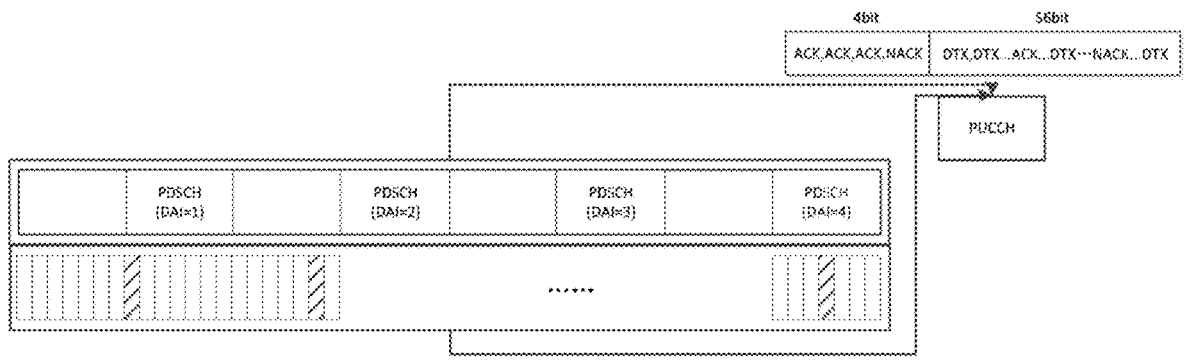
Figures 1, 2, 3:
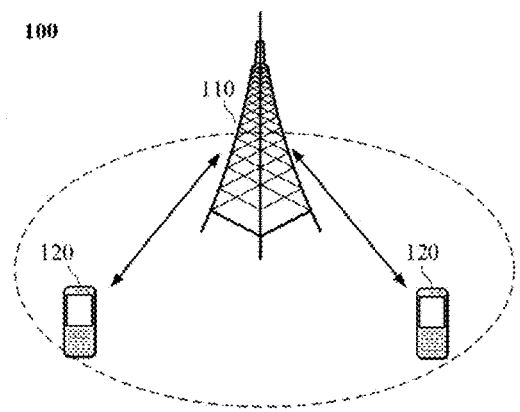
Figure 2:
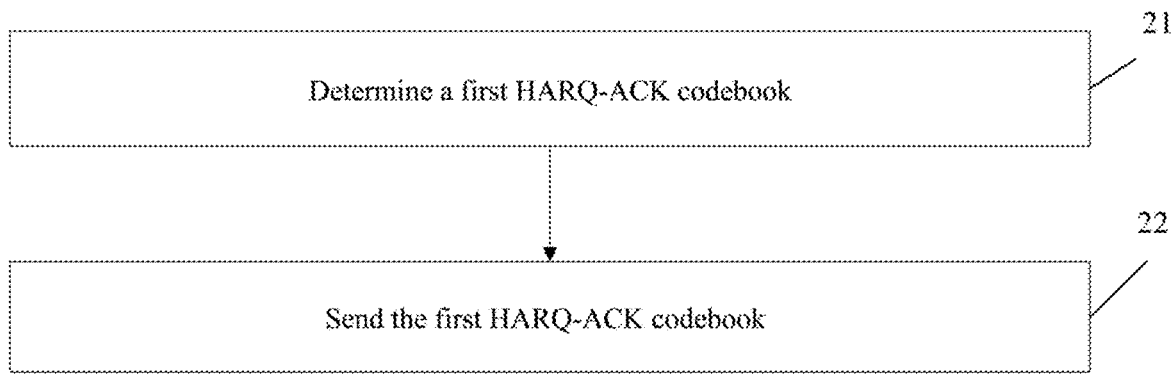
Figure 3:
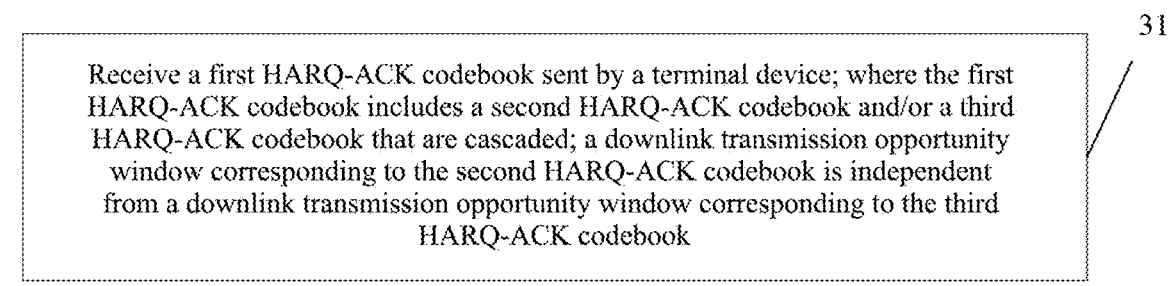

Exemplarily, a communication system 100 to which embodiments of the present disclosure are applied may be as shown in FIG. 1-3. The communication system 100 may include a network device 110, and the network device 110 may be a device that communicates with a UE 120 (or called a communication terminal, a terminal). The network device 110 may provide communication coverage for a specific geographic area, and may communicate with UEs located in the coverage area. Optionally, the network device 110 may be an evolutional network device (Evolutional Node B, eNB or eNodeB) in an LTE system, or a wireless controller in a cloud radio access network (CRAN), or the network device may be a mobile switching center, a relay station, an access point, a vehicle-mounted device, a wearable device, a hub, a switch, a bridge, a router, a network side device in a 5G network, or a network device in a public land mobile network (PLMN) that is evolved in the future, etc.

The communication system 100 further includes at least one UE 120 located within the coverage of the network device 110. The UE 120 and the network device 110 may be connected through a wireless or wired connection. A UE that is wirelessly connected to the network device 110 may be referred to as a "wireless communication terminal", a "wireless terminal" or a "mobile terminal".

Optionally, device to device (D2D) communication may be performed between UEs 120.

It should be understood that the terms "system" and "network" herein are often used interchangeably in this text. The term "and/or" herein is only an association relationship describing associated objects, which means that there may be three kinds of relationships, for example, "A and/or B" may represent three situations: A exists alone, A and B exist at the same time, B exists alone. In addition, the character "/" herein generally indicates that associated objects before and after the character are in an "or" relationship.

An embodiment of the present disclosure provides a feedback method for semi-static transmission. As shown in FIG. 2, the method includes the following steps.

Step 21: determine a first HARQ-ACK codebook; where the first HARQ-ACK codebook includes a second HARQ-ACK codebook and/or a third HARQ-ACK codebook that are combined; a downlink transmission occasion window corresponding to the second HARQ-ACK codebook is independent from a downlink transmission occasion window corresponding to the third HARQ-ACK codebook.

In a specific embodiment, that the downlink transmission occasion window corresponding to the second HARQ-ACK codebook is independent from the downlink transmission occasion window corresponding to the third HARQ-ACK codebook described above may also refer to that: the downlink transmission occasion window corresponding to the second HARQ-ACK codebook is different from the downlink transmission occasion window corresponding to the third HARQ-ACK codebook, or refer to that: both of the downlink transmission occasion window corresponding to the second HARQ-ACK codebook and the downlink transmission occasion window corresponding to the third HARQ-ACK codebook are set independently.

Step 22: send the first HARQ-ACK codebook.

The second HARQ-ACK codebook is for dynamic transmission, and/or, the third HARQ-ACK codebook is for SPS transmission.

Correspondingly, a feedback method for semi-static transmission provided by this embodiment is applied to a network device. As shown in FIG. 3, the method includes:

step 31: receive the first HARQ-ACK codebook sent by the terminal device; where the first HARQ-ACK codebook includes the second HARQ-ACK codebook and/or the third HARQ-ACK codebook that are combined; the downlink transmission occasion window corresponding to the second HARQ-ACK codebook is independent from the downlink transmission occasion window corresponding to the third HARQ-ACK codebook.

By optimizing the setting of feedback windows and improving the HARQ-ACK feedback of SPS, on the one hand, centralized feedback of the SPS, which causes a PUCCH to be overloaded and affects transmission reliability, can be avoided. On the other hand, invalid HARQ-ACK feedback is tried to be reduced or even avoided to improve PUCCH transmission efficiency.

Figure 4:
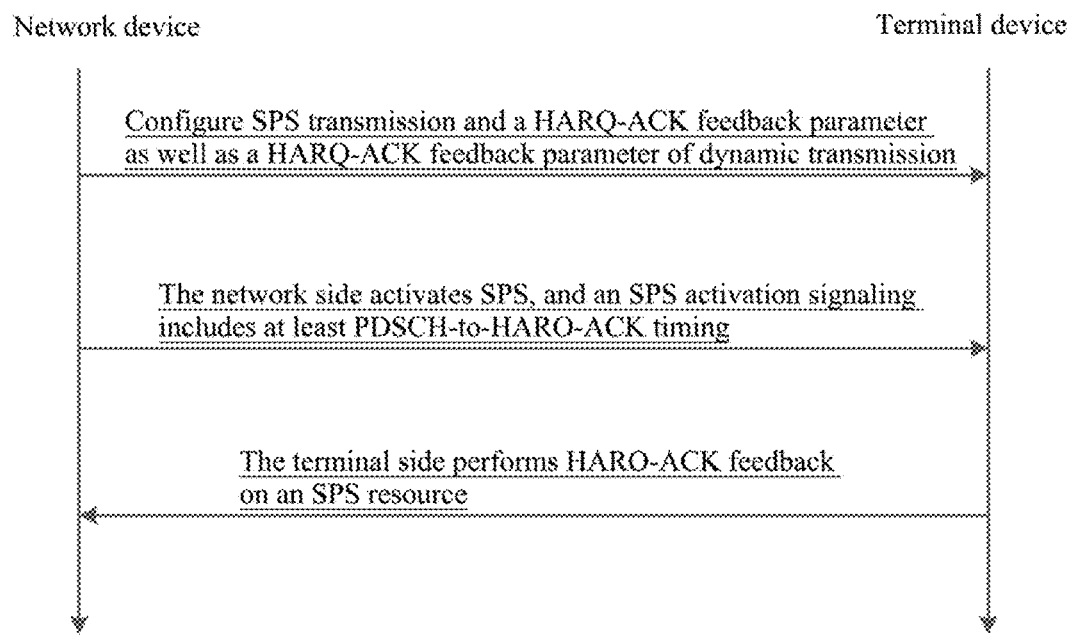
FIGS. 4 to 7 are schematic diagrams of various processing scenarios provided by embodiments of the present disclosure.

The solution of this embodiment is described with reference to FIG. 4: first, the network device configures SPS transmission and a HARQ feedback parameter, as well as a HARQ feedback parameter of dynamic transmission for the terminal device; the network device activates SPS, and an SPS activation signaling includes a PDSCU transmission occasion; the terminal device performs HARQ feedback on an SPS resource to the network device.

The following describes the solution provided by this embodiment in multiple scenarios.

Scenario 1.

A first downlink transmission occasion window corresponding to the second HARQ-ACK codebook is determined according to a first HARQ-ACK timing set.

A second downlink transmission occasion window corresponding to the third HARQ-ACK codebook is configured by a network side or agreed by a protocol.

A network side configuration includes at least one of the following: a semi-static configuration and a dynamic configuration.

Specifically, the first downlink transmission occasion window is all or a part of elements of a set of {HARQ-ACK feedback slot n-HARQ-ACK timing k}.

For example, if the first HARQ-ACK timing set, a PDSCH-to-HARQ-ACK timing set, configured for dynamic transmission by the network side is {1,2,3,4,5,6,7,8}, then the first downlink transmission occasion window corresponding to the HARQ-ACK codebook fed back in slot n is {n-7, n-6, . . . n-1}.

In this scenario, the downlink transmission occasion window corresponding to the second HARQ-ACK codebook is independent from the downlink transmission occasion window corresponding to the third HARQ-ACK codebook. Typically, the downlink transmission occasion window corresponding to the third HARQ-ACK codebook is one slot and is smaller than a feedback window of dynamic transmission, and HARQ-ACK of SPS can be fed back in refined segments to avoid excessive concentration of the HARQ-ACK of the SPS and an excessive PUCCH load, which affects PUCCH reliability.

For example, the following processing procedures can be included.

Step 1: the network side configures a feedback parameter of SPS transmission and a HARQ-ACK feedback parameter of dynamic transmission.

The network side configures SPS resources for the terminal device to support a small packet service or a low-latency service. The parameter of the SPS transmission includes at least: an SPS period. For example, for a low-latency service, the network side configures SPS resources with a period of 2 symbols.

The network side configures the HARQ-ACK feedback parameter of the dynamic transmission for the terminal device, and the HARQ-ACK feedback parameter includes at least: a feedback mode. Further, the HARQ-ACK feedback parameter may also include a PDSCH-to-HARQ-ACK timing set.

The feedback mode includes a dynamic HARQ-ACK codebook and a semi-static HARQ-ACK codebook. The former only provides feedback for a transmission and SPS PDSCH release indicated by a downlink assignment index (DAI) within the feedback window, while the latter provides feedback for all non-overlapping transmission occasions within the feedback window. For the case of no data transmission, a DTX occupation is used. See section 9.1 of 38.213 for details.

Figure 5:
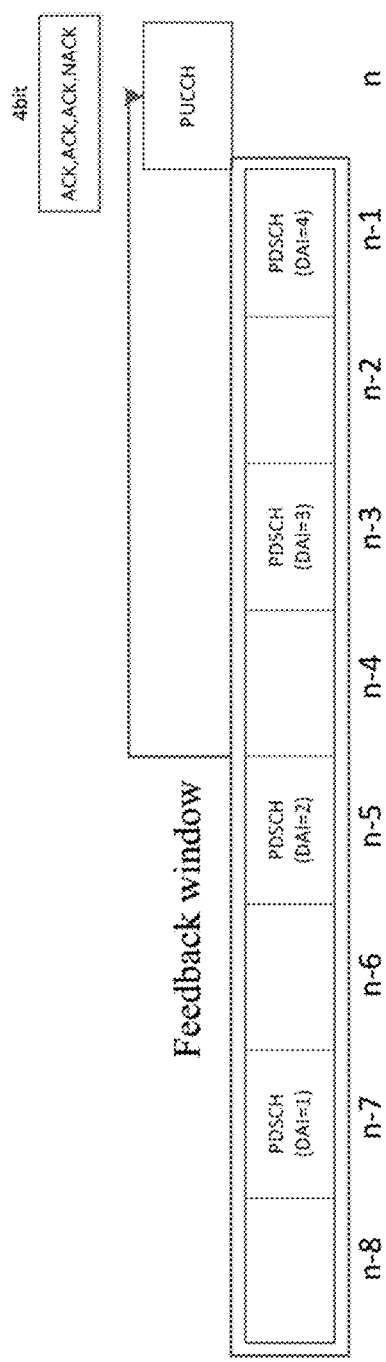

The PDSCH-to-HARQ-ACK timing set is used to configure a value range of a PDSCH-to-HARQ-ACK timing, and in addition, a HARQ-ACK feedback window can also be determined based on this set. For example, the PDSCH-to-HARQ-ACK timing set configured for the dynamic transmission by the network side is {1,2,3,4,5,6,7,8}, then the feedback window corresponding to the HARQ-ACK codebook fed back in slot n is {n-7, n-6, . . . n-1}, as shown in FIG. 5.

Step 2: the terminal side receives the feedback parameter of the SPS transmission and the HARQ-ACK feedback parameter of the dynamic transmission.

Step 3: the network side activates SPS through downlink control information (DCI).

The DCI may include a second HARQ-ACK timing (PDSCH-to-HARQ-ACK timing) set for the second downlink transmission occasion window.

For example, a PDSCH-to-HARQ-ACK timing set is {1}. Then the network side sends data in slot m, and then detects, in slot m+1, the HARQ-ACK corresponding to all SPS transmission occasions in slot m. For another example, if the time window agreed by the protocol is 2 slots, then the HARQ-ACK corresponding to all SPS transmission occasions in slot m and slot m−1 is detected in slot m+1.

Step 4: the terminal side receives the DCI, and detects downlink data on a corresponding SPS resource.

Step 5: the terminal side feeds back on the SPS transmission based on a detection result of step 4 and the feedback parameter of the SPS transmission. Specifically, step 5.1 the terminal side determines a HARQ-ACK feedback format.

For example, the terminal device receives SPS data in slot m, and then sends, in slot m+x (x is determined by PDSCH-to-HARQ-ACK feedback timing in step 3), the HARQ-ACK corresponding to all SPS transmission occasions within slot m (determined by the size of an SPS feedback window agreed by the protocol).

If there is no HARQ-ACK feedback of dynamic transmission in slot m+x, then the HARQ-ACK corresponding to all SPS transmission occasions in slot m is sent in slot m+x. As shown in the lower left part of FIG. 6, the HARQ-ACK of 7 SPS resources (taking SPS with a period of 2 symbols as an example, there are 7 SPS resources in 1 slot) within slot m is fed back in slot m+x. If there is no data transmission on an SPS resource, then a DTX occupation is used. Further, if there is no data transmission on all SPS resources within the feedback window (slot m), then no HARQ-ACK is fed back.

Figure 6:
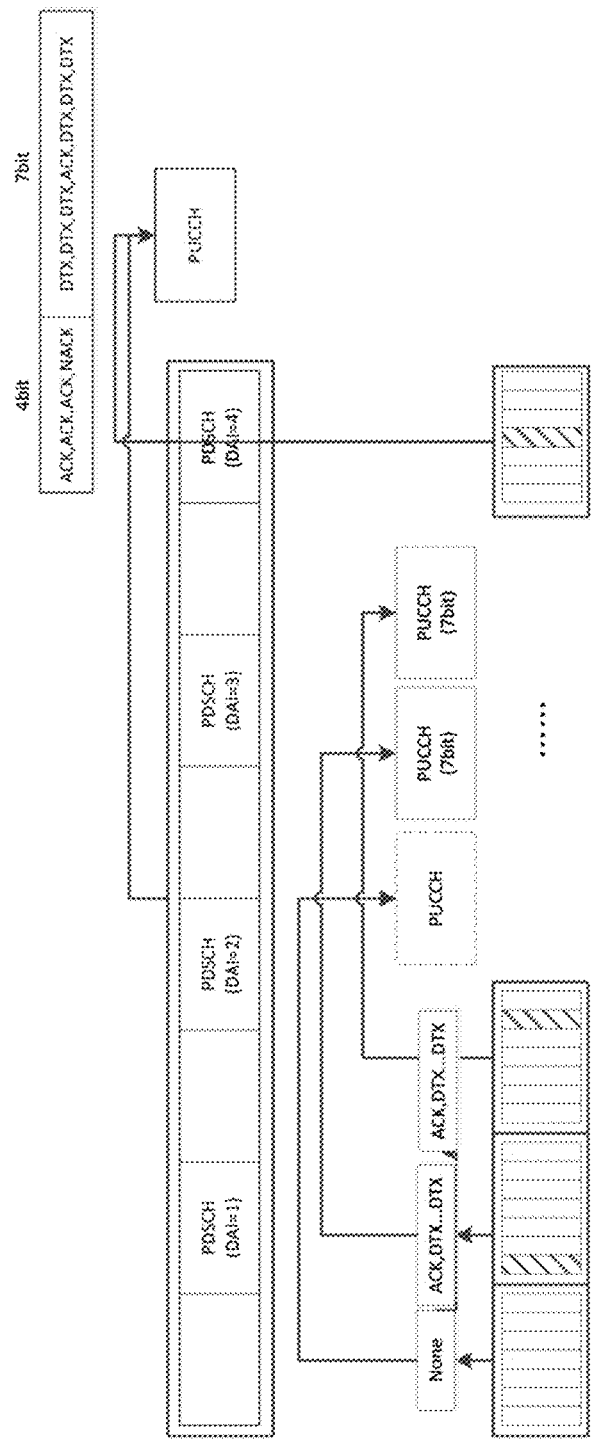

If there is the HARQ-ACK feedback of the dynamic transmission in slot m+x, as shown in the upper right part of FIG. 6, the HARQ-ACK feedback of the SPS transmission and the dynamic transmission are multiplexed. The first part is the HARQ-ACK feedback for the dynamic transmission. The feedback content depends on the HARQ-ACK feedback mode and the feedback window of the dynamic transmission (configured in step 1). FIG. 6 shows an example of a dynamic HARQ-ACK codebook, that is, only feeding back for a transmission indicated by DAI/total DAI. The second part is the HARQ-ACK feedback for the SPS. The feedback format is HARQ-ACK for all SPS transmission occasions within the SPS feedback window (1 slot agreed by the protocol). A technical benefit is that: the SPS feedback window is shortened and is smaller than the feedback window of the dynamic transmission, and the HARQ-ACK of the SPS can be fed back in refined segments to avoid excessive concentration of the HARQ-ACK of the SPS and an excessive PUCCH load, which affects PUCCH reliability.

Step 5.2 the terminal side sends HARQ-ACK feedback content determined in step 5.1.

Step 6: the network side receives the HARQ-ACK feedback from the terminal side. The HARQ-ACK format is the same as that described above.

Still further, the second downlink transmission occasion window corresponding to the third HARQ-ACK codebook is configured by the network side, or agreed by the protocol.

For example, in step 1, the size of the second downlink transmission occasion window corresponding to the third HARQ-ACK codebook is configured by the network side or agreed by the protocol.

In other words, the network side also needs to configure the SPS HARQ-ACK, that is, the size of the second downlink transmission occasion window. The feedback window may be directly configured or indicated by other parameters. For example, the size of the feedback window is 1 unit of the PDSCH-to-HARQ-ACK feedback timing (for example, slot, subslot or N symbols, N>=1). For another example, the size of the feedback window is determined by the SPS period, and the size of the feedback window is the length of 1 SPS period.

In this way, the network side can configure the size of an SPS HARQ-ACK feedback window according to service transmission and/or PUCCH conditions, thereby optimizing system design. For example, for an ultra-low-latency service, the SPS HARQ-ACK feedback window may be 1 subslot (2 symbols), which can also reduce feedback delay of the SPS HARQ-ACK.

Or,
at least two second downlink transmission occasion windows corresponding to the third HARQ-ACK codebook are independently configured, respectively. The configuration of the at least two second downlink transmission occasion windows is based on one of the following:
being distinguished by a transmitted service, a format of DCI for scheduling or activating a downlink transmission resource, a radio network temporary identity (RNTI) of the DCI for scheduling or activating the downlink transmission resource, a service type or service priority indicated by the DCI for scheduling or activating the downlink transmission resource.

For example, a system is configured with multiple SPS resources, a service or logical channel carried by each SPS resource is independently configured (which may be configured explicitly or implicitly), and HARQ-ACK feedback windows of SPS resources carrying different services or corresponding to different logical channels are independently configured. For example, an SPS HARQ-ACK feedback window for carrying an eMBB (VOIP) service is determined by the feedback window of the dynamic transmission. A value of an SPS HARQ-ACK feedback window for carrying a URLL service is determined by a network side configuration. For another example, the SPS HARQ-ACK feedback window for carrying the eMBB (VOIP) service is determined by an eMBB feedback window of the dynamic transmission; the SPS HARQ-ACK feedback window for carrying the URLLC service is determined by a URLLC feedback window of the dynamic transmission.

In this way, various services are designed differently, which not only takes into account of the needs of various services, but also meets the optimization of system efficiency (PUCCH efficiency).

Scenario 2. This scenario is different from scenario 1 in that this scenario focuses on dynamically indicating the length of a feedback window of HARQ-ACK for SPS.

The difference from the above scenario is in step 5. Specifically,
step 5: the terminal side feeds back on the SPS resource based on the detection result of step 4 and the feedback parameter of the SPS transmission. Specifically,
step 5.1 the terminal side determines the HARQ-ACK feedback format.

The second downlink transmission occasion window corresponding to the third HARQ-ACK codebook is determined by a second HARQ-ACK timing.

For example, the terminal device receives SPS data in slot m, and then sends, in slot m+x (x is determined by the PDSCH-to-HARQ-ACK feedback timing in step 3), the HARQ-ACK corresponding to all SPS transmission occasions within slot m (determined by the size of the SPS feedback window agreed by the protocol).

If there is no HARQ-ACK feedback of dynamic transmission in slot m+x, then the HARQ-ACK corresponding to all SPS transmission occasions in slot m is sent in slot m+x. As shown in the lower left part of FIG. 6, the HARQ-ACK of 7 SPS resources (taking SPS with a period of 2 symbols as an example, there are 7 SPS resources in 1 slot) within slot m is fed back in slot m+x. If there is no data transmission on the SPS resource, then the DTX occupation is used. Further, if there is no data transmission on all SPS resources within the feedback window (slot m), then no HARQ-ACK is fed back.

Figure 7:
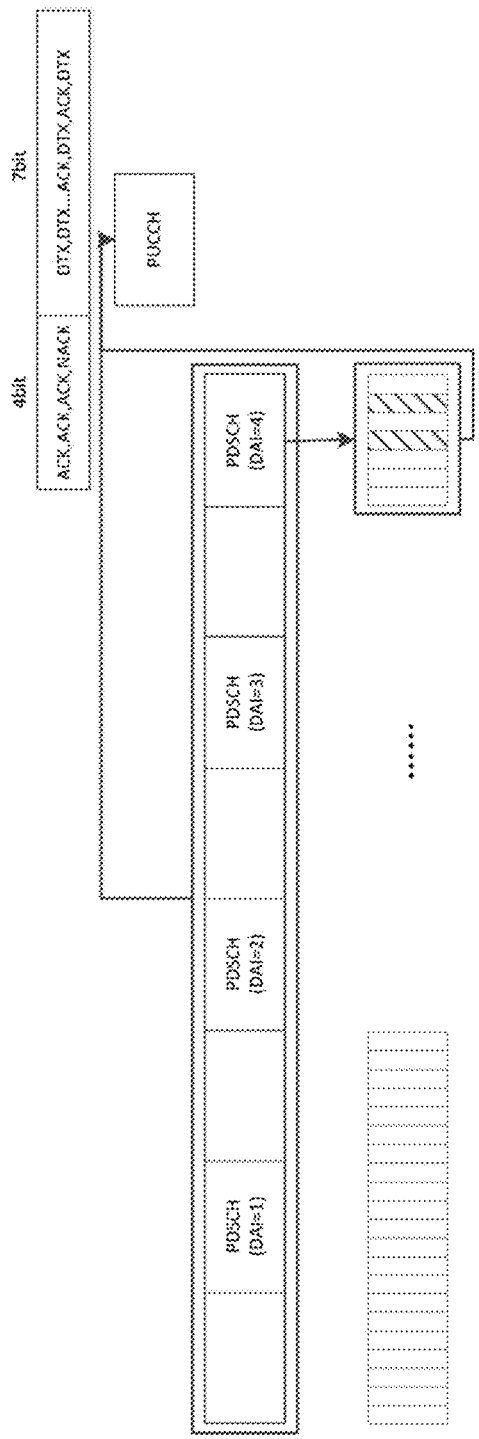

If there is the HARQ-ACK feedback of the dynamic transmission in slot m+x, as shown in the upper right part of FIG. 7, the HARQ-ACK feedback of the SPS transmission and the dynamic transmission are multiplexed. The first part is the HARQ-ACK feedback for the dynamic transmission. The feedback content depends on the HARQ-ACK feedback mode and the feedback window of the dynamic transmission (configured in step 1). FIG. 7 shows an example of a dynamic HARQ-ACK codebook, that is, only feeding back for a transmission indicated by DAI/total DAI. The second part is the HARQ-ACK feedback for the SPS. The feedback format is HARQ-ACK for all SPS transmission occasions within the SPS feedback window indicated in a scheduling signaling of the last dynamic transmission. As shown in FIG. 7, scheduling signaling DCI of a PDSCH with DAI=4 indicates that the SPS feedback window is 1, which means that the SPS HARQ-ACK feedback window is the last slot of the feedback window of the dynamic transmission. For another example, the scheduling signaling DCI of the PDSCH with DAI=4 indicates that the SPS feedback window is 2, which means that the SPS HARQ-ACK feedback window is the last slot and the penultimate slot of the feedback window of the dynamic transmission. In this way, the SPS feedback window can be dynamically adjusted to better match the actual transmission, thereby avoiding invalid HARQ-ACK feedback.

Step 5.2 the terminal side sends the HARQ-ACK feedback content determined in step 5.1.

Or, still further, this embodiment may also provide the following processing.

Indicating an end position of the second downlink transmission occasion window by a dynamic configuration includes:
using n slots before the slot indicated by the dynamic configuration as the second downlink transmission occasion window, where n is an integer greater than or equal to 1.

That is, a position of the SPS HARQ-ACK feedback window (that is, the second downlink transmission occasion window) is further accurately determined according to a dynamic indication, such as last n SPS resources within m slots. For example, m slots may be first determined as a candidate downlink transmission occasion window of the SPS using the foregoing method, and then the end position thereof is further indicated through the dynamic configuration, so as to obtain n of them as the second downlink transmission occasion window corresponding to the SPS.

In this way, the SPS HARQ-ACK feedback window is further refinedly indicated, which avoids the HARQ-ACK feedback from being too concentrated, and can adapt to actual transmission situations and avoid/reduce invalid HARQ-ACK feedback.

Based on the foregoing, the second downlink transmission occasion window further includes:
 m slots after the slot indicated by the dynamic configuration; m is an integer greater than or equal to 1.

That is, the feedback format is previous n slots including the current slot indicated in a scheduling signaling for the dynamic transmission (that is, slot m-n to slot m, where slot m is the slot where the scheduling signaling is located, the size of a dynamic feedback window of the SPS HARQ-ACK). If the dynamic feedback window contains multiple scheduling signalings of the dynamic transmission, then a final SPS feedback format is formed by combining each SPS HARQ-ACK feedback window indicated dynamically.

That is, all SPS resources within the first downlink transmission occasion after the last scheduling signaling. In this way, HARQ-ACK feedback of an unused SPS resource between dynamic transmissions can be compressed out.

In this scenario, the dynamic configuration is: an indication by DCI for scheduling dynamic transmission.

An implementation thereof may include adding an indication field of the SPS HARQ-ACK feedback window on the basis of the existing DCI;
 or, the existing DCI field is multiplexed, for example, an MCS field is compressed from 5 bits to 3 bits, and extra 2 bits are used to indicate the SPS HARQ-ACK feedback window.

In this way, the setting of the downlink transmission occasion windows can be optimized by independently configuring the downlink transmission occasion windows corresponding to multiple combined feedback codebooks, thereby avoiding aggregated feedback of abundant resources, which causes a problem of uplink feedback resources being overloaded and affecting transmission reliability; on the other hand, invalid feedback can be avoided and transmission efficiency is improved.

Figure 8:
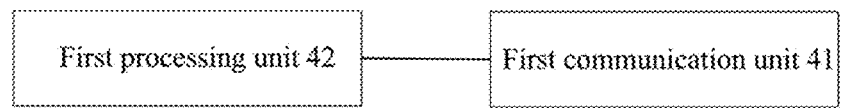
FIG. 8 is a schematic diagram of a composition structure of a terminal device provided by an embodiment of the present disclosure.

An embodiment of the present disclosure provides a terminal device, as shown in FIG. 8, including:
 a first processing unit 42, which determines a first HARQ-ACK codebook; where the first HARQ-ACK codebook includes a second HARQ-ACK codebook and/or a third HARQ-ACK codebook that are combined; a downlink transmission occasion window corresponding to the second HARQ-ACK codebook is independent from a downlink transmission occasion window corresponding to the third HARQ-ACK codebook.

In a specific embodiment, that the downlink transmission occasion window corresponding to the second HARQ-ACK codebook is independent from the downlink transmission occasion window corresponding to the third HARQ-ACK codebook described above may also refer to that: the downlink transmission occasion window corresponding to the second HARQ-ACK codebook is different from the downlink transmission occasion window corresponding to the third HARQ-ACK codebook, or refer to that: both of the downlink transmission occasion window corresponding to the second HARQ-ACK codebook and the downlink transmission occasion window corresponding to the third HARQ-ACK codebook are set independently.

A first communication unit 41 sends the first HARQ-ACK codebook.

The second HARQ-ACK codebook is for dynamic transmission, and/or, the third HARQ-ACK codebook is for SPS transmission.

Figure 9:
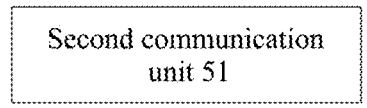
FIG. 9 is a schematic diagram of a composition structure of a network device provided by an embodiment of the present disclosure.

Correspondingly, this embodiment provides a network device, as shown in FIG. 9, including:
 a second communication unit 51, which receives the first HARQ-ACK codebook sent by the terminal device; where the first HARQ-ACK codebook includes the second HARQ-ACK codebook and/or the third HARQ-ACK codebook that are combined; the downlink transmission occasion window corresponding to the second HARQ-ACK codebook is independent from the downlink transmission occasion window corresponding to the third HARQ-ACK codebook.

The following describes the solution provided by this embodiment in multiple scenarios.

Scenario 1.

A first downlink transmission occasion window corresponding to the second HARQ-ACK codebook is determined according to a first HARQ-ACK timing set.

A second downlink transmission occasion window corresponding to the third HARQ-ACK codebook is configured by a network side or agreed by a protocol.

A network side configuration includes at least one of the following: a semi-static configuration and a dynamic configuration.

Specifically, the first downlink transmission occasion window is all or a part of elements of a set of {HARQ-ACK feedback slot n-HARQ-ACK timing k}.

In this scenario, the downlink transmission occasion window corresponding to the second HARQ-ACK codebook is independent from the downlink transmission occasion window corresponding to the third HARQ-ACK codebook. Typically, the downlink transmission occasion window corresponding to the third HARQ-ACK codebook is one slot and is smaller than a feedback window of dynamic transmission, and HARQ-ACK of SPS can be fed back in refined segments to avoid excessive concentration of the HARQ-ACK of the SPS and an excessive PUCCH load, which affects PUCCH reliability.

Still further, the second downlink transmission occasion window corresponding to the third HARQ-ACK codebook is configured by the network side, or agreed by the protocol.

The size of the second downlink transmission occasion window corresponding to the third HARQ-ACK codebook is configured by the network side or agreed by the protocol.

Or,
 at least two second downlink transmission occasion windows corresponding to the third HARQ-ACK codebook are independently configured, respectively. The configuration of the at least two second downlink transmission occasion windows is based on one of the following:
 being distinguished by a transmitted service, a format of DCI for scheduling or activating a downlink transmission resource, an RNTI of the DCI for scheduling or activating the downlink transmission resource, a service type or service priority indicated by the DCI for scheduling or activating the downlink transmission resource.

Scenario 2. This scenario is different from scenario 1 in that this scenario focuses on dynamically indicating the length of a feedback window of HARQ-ACK for SPS.

The second downlink transmission occasion window corresponding to the third HARQ-ACK codebook is determined by a second HARQ-ACK timing.

Or, indicating an end position of the second downlink transmission occasion window by a dynamic configuration includes:
 using n slots before the slot indicated by the dynamic configuration as the second downlink transmission occasion window, where n is an integer greater than or equal to 1.

That is, a position of an SPS HARQ-ACK feedback window (that is, the second downlink transmission occasion window) is further accurately determined according to a dynamic indication, such as last n SPS resources within m slots. For example, m slots may be first determined as a candidate downlink transmission occasion windows of SPS using the foregoing method, and then the end position thereof is further indicated through the dynamic configuration, so as to obtain n of them as the second downlink transmission occasion window corresponding to the SPS.

In this way, the SPS HARQ-ACK feedback window is further refinedly indicated, which avoids the HARQ-ACK feedback from being too concentrated, and can adapt to actual transmission situations and avoid/reduce invalid HARQ-ACK feedback.

Based on the foregoing, the second downlink transmission occasion window further includes:

m slots after the slot indicated slot by the dynamic configuration; m is an integer greater than or equal to 1.

That is, the feedback format is previous n slots including the current slot indicated in a scheduling signaling for the dynamic transmission (that is, slot m-n to slot m, where slot m is the slot where the scheduling signaling is located, the size of a dynamic feedback window of the SPS HARQ-ACK). If the dynamic feedback window contains multiple scheduling signalings of the dynamic transmission, then a final SPS feedback format is formed by combining each SPS HARQ-ACK feedback window indicated dynamically.

That is, all SPS resources within the first downlink transmission occasion after the last scheduling signaling. In this way, HARQ-ACK feedback of an unused SPS resource between dynamic transmissions can be compressed out.

In this scenario, the dynamic configuration is: an indication by DCI for scheduling dynamic transmission.

An implementation thereof may include adding an indication field of the SPS HARQ-ACK feedback window on the basis of the existing DCI;

or, the existing DCI field is multiplexed, for example, an MCS field is compressed from 5 bits to 3 bits, and extra 2 bits are used to indicate the SPS HARQ-ACK feedback window.

In this way, the setting of the downlink transmission occasion windows can be optimized by independently configuring the downlink transmission occasion windows corresponding to multiple combined feedback codebooks, thereby avoiding aggregated feedback of abundant resources, which causes a problem of uplink feedback resources being overloaded and affecting transmission reliability; on the other hand, invalid feedback can be avoided and transmission efficiency is improved.

Figure 10:
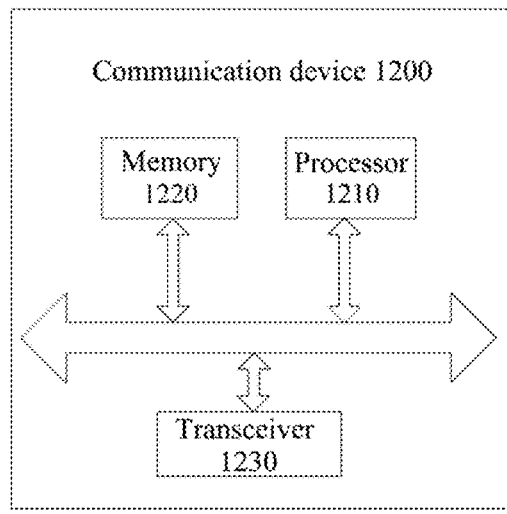
FIG. 10 is a schematic diagram of a composition structure of a communication device provided by an embodiment of the present disclosure.

FIG. 10 is a schematic structural diagram of a communication device 1200 provided by an embodiment of the present disclosure. The communication device in this embodiment may be specifically the terminal device or the network device in the foregoing embodiments. A communication device 1200 shown in FIG. 10 includes a processor 1210, and the processor 1210 can call and run a computer program from a memory to implement the methods in the embodiments of the present disclosure.

Optionally, as shown in FIG. 10, the communication device 1200 may further include a memory 1220. The processor 1210 can call and run a computer program from the memory 1220 to implement the methods in the embodiments of the present disclosure.

The memory 1220 may be a separate device independent of the processor 1210, or may be integrated in the processor 1210.

Optionally, as shown in FIG. 10, the communication device 1200 may further include a transceiver 1230, and the processor 1210 may control the transceiver 1230 to communicate with other devices, and specifically, to send information or data to other devices, or receive information or data sent by other devices.

The transceiver 1230 may include a transmitter and a receiver. The transceiver 1230 may further include an antenna, and the number of the antenna may be one or more.

Optionally, the communication device 1200 may specifically be the terminal device in the embodiments of the present disclosure, and the communication device 1200 may implement corresponding procedures implemented by the mobile terminal/terminal device in the methods of the embodiments of the present disclosure, which will not be repeated here for the sake of brevity.

Figure 11:
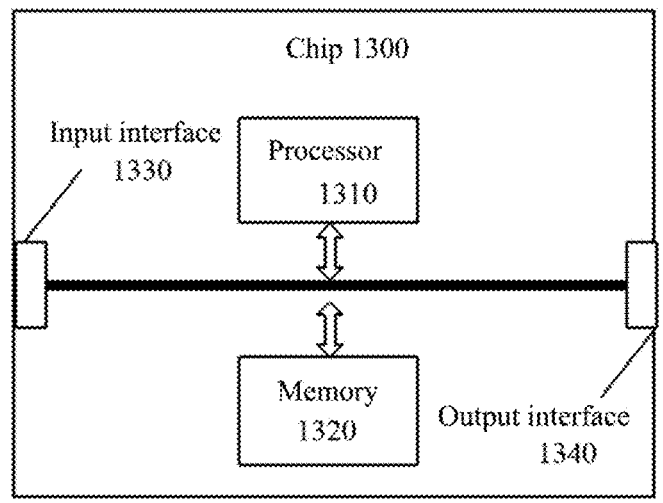
FIG. 11 is a schematic block diagram of a chip provided by an embodiment of the present disclosure.

FIG. 11 is a schematic structural diagram of a chip of an embodiment of the present disclosure. A chip 1300 shown in FIG. 11 includes a processor 1310, and the processor 1310 can call and run a computer program from a memory to implement the methods in the embodiments of the present disclosure.

Optionally, as shown in FIG. 11, the chip 1300 may further include a memory 1320. The processor 1310 may call and run a computer program from the memory 1320 to implement the methods in the embodiments of the present disclosure.

The memory 1320 may be a separate device independent of the processor 1310, or may be integrated in the processor 1310.

Optionally, the chip 1300 may further include an input interface 1330. The processor 1310 can control the input interface 1330 to communicate with other devices or chips, and specifically, to obtain information or data sent by other devices or chips.

Optionally, the chip 1300 may further include an output interface 1340. The processor 1310 can control the output interface 1340 to communicate with other devices or chips, and specifically, to output information or data to other devices or chips.

Optionally, the chip can be applied to the terminal device or the network device in the embodiments of the present disclosure, and the chip can implement corresponding procedures implemented by the terminal device in the methods of the embodiments of the present disclosure, which will not be repeated here for the sake of brevity.

It should be understood that the chip mentioned in the embodiments of the present disclosure may also be referred to as a system-level chip, a system-on-chip, an SoC, or a system-on-chip chip, etc.

It should be understood that the processor according to embodiments of the present disclosure may be an integrated circuit chip with the capability of processing signals. In the implementation process, the steps of the foregoing method embodiments can be completed by an integrated logic circuit in hardware of the processor or by instructions in the form of software. The above processor may be a general-purpose processor, a digital signal processor (DSP), an application specific integrated circuit (ASIC), a field programmable gate array (FPGA) or other programmable logic devices, discrete gates or transistor logic devices, discrete hardware components, which can implement or perform the methods, steps, and logical block diagrams disclosed in the embodiments of the present disclosure. The general-purpose processor may be a microprocessor, or the processor may also be any conventional processor or the like. The steps of the methods disclosed in combination with embodiments of the present disclosure can be directly embodied as being executed and completed by a hardware decoding processor, or being executed and completed by a combination of hardware and software modules in a decoding processor. The software modules can be located in a storage medium which is mature in the art, such as a random access memory, a flash memory, a read-only memory, a programmable read-only memory, an electrically erasable programmable memory, a register, etc. The storage medium is located in a memory, and the processor reads information in the memory and completes the steps of the above methods in combination with hardware thereof.

It can be understood that the memory in embodiments of the present disclosure may be a volatile memory or a non-volatile memory, or may include both volatile and non-volatile memories. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which is used as an external cache. By way of exemplary but not restrictive description, various RAMs are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM)) and a direct rambus random access memory (DR RAM). It should be noted that the memories of the systems and methods described herein are intended to include, but are not limited to, these and any other suitable types of memories.

It should be understood that the above memories are exemplary but not restrictive. For example, the memory in embodiments of the present disclosure may also be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM) and a direct rambus random access memory (DR RAM), etc. That is to say, the memories in embodiments of the present disclosure are intended to include, but not limited to, these and any other suitable types of memories.

Figure 12:
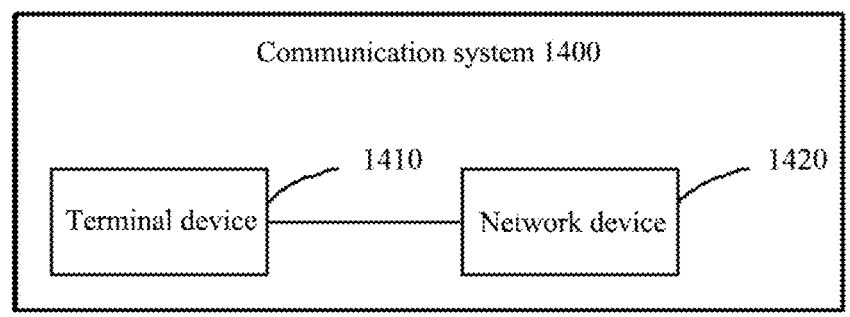
FIG. 12 is a second schematic diagram of a communication system architecture provided by an embodiment of the present disclosure.

FIG. 12 is a schematic block diagram of a communication system 1400 according to an embodiment of the present disclosure. As shown in FIG. 12, the communication system 1400 includes a terminal device 1410 and a network device 1420.

The terminal device 1410 can be used to implement corresponding functions implemented by the terminal device in the above methods, and the network device 1420 can be used to implement corresponding functions implemented by the network device in the above methods, which will not be repeated here for the sake of brevity.

An embodiment of the present disclosure also provides a computer-readable storage medium for storing computer programs.

Optionally, the computer-readable storage medium may be applied to the network device in the embodiments of the present disclosure, and the computer program causes a computer to execute corresponding procedures implemented by the network device in the methods of the embodiments of the present disclosure, which will not be repeated here for the sake of brevity.

Optionally, the computer-readable storage medium may be applied to the terminal device in the embodiments of the present disclosure, and the computer program causes a computer to execute corresponding procedures implemented by the mobile terminal/terminal device in the methods of the embodiments of the present disclosure, which will not be repeated here for the sake of brevity.

An embodiment of the present disclosure also provide a computer program product, including computer program instructions.

Optionally, the computer program product may be applied to the network device in the embodiments of the present disclosure, and the computer program instructions cause a computer to execute corresponding procedures implemented by the network device in the methods of the embodiments of the present disclosure, which will not be repeated here for brevity.

Optionally, the computer program product may be applied to the mobile terminal/terminal device in the embodiments of the present disclosure, and the computer program instructions cause a computer to execute corresponding procedures implemented by the mobile terminal/terminal device in the methods of the embodiments of the present disclosure, which will not be repeated here for the sake of brevity.

An embodiment of the present disclosure also provides a computer program.

Optionally, the computer program may be applied to the network device in the embodiments of the present disclosure. When the computer program runs on a computer, a computer is caused to execute corresponding procedures implemented by the network device in the methods of the embodiments of the present disclosure, which will not be repeated here for the sake of brevity.

Optionally, the computer program may be applied to the mobile terminal/terminal device in the embodiments of the present disclosure. When the computer program runs on a computer, the computer is caused to execute corresponding procedures implemented by the mobile terminal/terminal device in the methods of the embodiments of the present disclosure, which will not be repeated here for the sake of brevity.

Those ordinary persons skilled in the art may realize that the units and algorithm steps of the examples described in combination with embodiments disclosed herein can be implemented by electronic hardware, or a combination of computer software and electronic hardware. Whether these functions are performed by hardware or software depends on specific applications and design constraints for the technical solution. Those skilled persons can use a different method to implement the described functions for each specific application, but such implementations should not be considered beyond the scope of the present disclosure.

Those skilled in the art can clearly understand that, for convenience and concise description, the corresponding processes in the foregoing method embodiments may be referred to for the specific operation processes of the systems, apparatuses, and units described above, and the details will not be repeated here.

It should be understood that, the systems, the apparatuses and the methods disclosed in the several embodiments provided in the present disclosure may be implemented in other ways. For example, the apparatus embodiments described above are merely illustrative. For example, the division of the units is merely a logical function division. There may be other divisions in actual implementation, for example, a plurality of units or components may be combined, or may be integrated into another system, or some features may be ignored or not implemented. In addition, the displayed or discussed mutual coupling or direct coupling or communication connection may be an indirect coupling or communication connection through some interfaces, apparatuses or units, and may be in electrical, mechanical or other forms.

Units described as separate components may or may not be physically separated, and components displayed as units may or may not be physical units, that is, they may be located in one place, or may be distributed on a plurality of network units. Some or all of the units may be selected according to actual requirements so as to achieve objectives of solutions of the embodiments.

In addition, the various functional units in the various embodiments of the present disclosure may be integrated into one processing unit, or each unit may physically exist alone, or two or more units may be integrated into one unit.

If the functions are implemented in the form of software functional units and sold or used as an independent product, they can be stored in a computer-readable storage medium. Based on this understanding, the essence, or the portion contributing to the prior art, or part of the technical solutions of the present disclosure can be embodied in the form of a software product. The computer software product is stored in a storage medium, including several instructions used to cause a computer device (which may be a personal computer, a server, or a network device, etc.) to perform all or parts of the steps of the methods described in the various embodiments of the present disclosure. The aforementioned storage medium includes various media that can store program codes, such as a U disk, a mobile hard disk, a read-only memory (ROM), a random access memory (RAM), a magnetic disk or an optical disk.

The above description is only specific implementations of the present disclosure, and the protection scope of the present disclosure is not limited thereto. Changes or replacements easily thought of by any person skilled in the art within the technical scope disclosed in the present disclosure should be covered within the protection scope of the present disclosure. Therefore, the protection scope of the present disclosure shall be subject to the protection scope of the claims.

What is claimed is:

1. A feedback method for semi-static transmission, applied to a terminal device, wherein the method comprises:
    determining a first hybrid automatic repeat request-acknowledgement (HARQ-ACK) codebook; wherein the first HARQ-ACK codebook comprises a second HARQ ACK codebook and a third HARQ ACK codebook that are combined; a downlink transmission occasion window corresponding to the second HARQ-ACK codebook and a downlink transmission occasion window corresponding to the third HARQ-ACK codebook are set independently; and
    sending the first HARQ-ACK codebook;
    wherein a second downlink transmission occasion window corresponding to the third HARQ-ACK codebook is configured by a network side or agreed by a protocol;
    wherein the second downlink transmission occasion window corresponding to the third HARQ-ACK codebook is configured by the network side comprises at least one of the following:
    the second downlink transmission occasion window corresponding to the third HARQ-ACK codebook is semi-statically configured or dynamically configured by the network side;
    wherein the third HARQ-ACK codebook is for SPS transmission;
    wherein a size of the second downlink transmission occasion window corresponding to the third HARQ-ACK codebook is configured by the network side or agreed by the protocol;
    wherein an end position of the second downlink transmission occasion window corresponding to the third HARQ-ACK codebook is determined by a first HARQ-ACK timing set.

2. The method according to claim 1, wherein, the second HARQ-ACK codebook is for dynamic transmission.

3. The method according to claim 2, wherein a first downlink transmission occasion window corresponding to the second HARQ-ACK codebook is determined according to a HARQ-ACK timing set of the dynamic transmission.

4. The method according to claim 1, wherein that the second downlink transmission occasion window corresponding to the third HARQ-ACK codebook is dynamically configured by the network side comprises: the terminal device receives downlink control information (DCI) sent by the network side, wherein the DCI is used to indicate the second downlink transmission occasion window corresponding to the third HARQ-ACK codebook;
    and the DCI is further used to indicate an end position of the second downlink transmission occasion window.

5. The method according to claim 1,
    wherein at least two second downlink transmission occasion windows corresponding to the third HARQ-ACK codebook are independently configured, respectively;
    and the at least two second downlink transmission occasion windows are configured based on one of the following:
    being distinguished by a transmitted service, a format of DCI for scheduling or activating a downlink transmission resource, a radio network temporary identity (RNTI) of the DCI for scheduling or activating the downlink transmission resource, a service type or service priority indicated by the DCI for scheduling or activating the downlink transmission resource.

6. A feedback method for semi-static transmission, applied to a network device, wherein the method comprises:
    receiving a first hybrid automatic repeat request-acknowledgement (HARQ-ACK) codebook sent by a terminal device; wherein the first HARQ-ACK codebook comprises a second HARQ ACK codebook and a third HARQ ACK codebook that are combined; a downlink transmission occasion window corresponding to the second HARQ-ACK codebook and a downlink transmission occasion window corresponding to the third HARQ-ACK codebook are set independently;
    configuring a second downlink transmission occasion window corresponding to the third HARQ-ACK codebook for the terminal device;
    wherein a configuration comprises at least one of the following:
    a semi-static configuration, a dynamic configuration;
    wherein the third HARQ-ACK codebook is for SPS transmission;

wherein a size of the second downlink transmission occasion window corresponding to the third HARQ-ACK codebook is configured by the network side or agreed by the protocol;

wherein an end position of the second downlink transmission occasion window corresponding to the third HARQ-ACK codebook is determined by a first HARQ-ACK timing set.

7. The method according to claim 6, wherein,
the second HARQ-ACK codebook is for dynamic transmission.

8. The method according to claim 7, wherein a first downlink transmission occasion window corresponding to the second HARQ-ACK codebook is determined according to a timing set of downlink transmission and uplink feedback of the dynamic transmission.

9. The method according to claim 7, further comprising:
sending downlink control information (DCI) to the terminal device, wherein the DCI is used to indicate the second downlink transmission occasion window corresponding to the third HARQ-ACK codebook.

10. The method according to claim 9, further comprising:
indicating an end position of the second downlink transmission occasion window by the dynamic configuration.

11. A terminal device, comprising: a processor and a memory for storing a computer program that is capable of running on the processor,
wherein the memory is configured to store the computer program, and the processor is configured to call and run the computer program stored in the memory to:
determine a first hybrid automatic repeat request-acknowledgement (HARQ-ACK) codebook; wherein the first HARQ-ACK codebook comprises a second HARQ ACK codebook and a third HARQ ACK codebook that are combined; a downlink transmission occasion window corresponding to the second HARQ-ACK codebook and a downlink transmission occasion window corresponding to the third HARQ-ACK codebook are set independently; and
send the first HARQ-ACK codebook;
wherein a second downlink transmission occasion window corresponding to the third HARQ-ACK codebook is configured by a network side or agreed by a protocol;
wherein the second downlink transmission occasion window corresponding to the third HARQ-ACK codebook is configured by the network side comprises at least one of the following:

the second downlink transmission occasion window corresponding to the third HARQ-ACK codebook is semi-statically configured or dynamically configured by the network side;

wherein the third HARQ-ACK codebook is for SPS transmission;

wherein a size of the second downlink transmission occasion window corresponding to the third HARQ-ACK codebook is configured by the network side or agreed by the protocol;

wherein an end position of the second downlink transmission occasion window corresponding to the third HARQ-ACK codebook is determined by a first HARQ-ACK timing set.

12. The terminal device according to claim 11, wherein,
the second HARQ-ACK feedback codebook is for dynamic transmission.

13. The terminal device according to claim 12, wherein a first downlink transmission occasion window corresponding to the second HARQ-ACK codebook is determined according to a HARQ-ACK timing set of the dynamic transmission.

14. The terminal device according to claim 11, wherein the processor is further configured to call and run the computer program stored in the memory to receive downlink control information (DCI) sent by the network side, wherein the DCI is used to indicate the second downlink transmission occasion window corresponding to the third HARQ-ACK codebook;

and the DCI is further used to indicate an end position of the second downlink transmission occasion window.

15. The terminal device according to claim 14, wherein the processor is further configured to call and run the computer program stored in the memory to use n slots before a slot indicated by a dynamic configuration as the second downlink transmission occasion window, wherein n is an integer greater than or equal to 1;
wherein the second downlink transmission occasion window further comprises:
m slots after a slot indicated by the dynamic configuration; wherein m is an integer greater than or equal to 1.

16. A network device, comprising: a processor and a memory for storing a computer program that is capable of running on the processor,
wherein the memory is configured to store the computer program, and the processor is configured to call and run the computer program stored in the memory to execute steps of the method according to claim 6.

* * * * *